United States Patent
Cooley et al.

(10) Patent No.: US 8,321,934 B1
(45) Date of Patent: *Nov. 27, 2012

(54) ANTI-PHISHING EARLY WARNING SYSTEM BASED ON END USER DATA SUBMISSION STATISTICS

(75) Inventors: Shaun Cooley, El Segundo, CA (US); William E. Sobel, Jamul, CA (US)

(73) Assignee: Symantec Corporation, Mountain View, CA (US)

( * ) Notice: Subject to any disclaimer, the term of this patent is extended or adjusted under 35 U.S.C. 154(b) by 935 days.

This patent is subject to a terminal disclaimer.

(21) Appl. No.: 12/115,352

(22) Filed: May 5, 2008

(51) Int. Cl.
*G06F 11/00* (2006.01)

(52) U.S. Cl. .......... 726/22; 709/227; 709/228; 709/229; 713/188; 713/150; 726/23; 726/24; 726/25

(58) Field of Classification Search .............. 726/22–25; 705/1; 709/227–229; 713/188, 150
See application file for complete search history.

(56) References Cited

U.S. PATENT DOCUMENTS

| | | | |
|---|---|---|---|
| 7,797,421 B1* | 9/2010 | Scofield et al. | 709/224 |
| 7,854,001 B1 | 12/2010 | Chen et al. | |
| 2004/0111632 A1 | 6/2004 | Halperin et al. | |
| 2005/0238005 A1 | 10/2005 | Chen et al. | |
| 2005/0262559 A1 | 11/2005 | Huddleston et al. | |
| 2006/0212925 A1 | 9/2006 | Shull et al. | |
| 2007/0192855 A1* | 8/2007 | Hulten et al. | 726/22 |
| 2007/0220595 A1* | 9/2007 | M'raihi et al. | 726/5 |
| 2008/0288303 A1* | 11/2008 | Gray et al. | 705/7 |

OTHER PUBLICATIONS

A Behavior-based Approach Towards Statistics—Preserving Network Trace Anonymization Song, Yingbo. ProQuest Dissertations and Theses 2012. vol. 0984,Iss.0054;p.n/a;Source: ProQuest Dissertations and Theses.*
Integrated detection of anomalous behavior of computer infrastructures Maggi, F.; Zanero, S. Network Operations and Management Symposium (NOMS), 2012 IEEE (1542-1201) (978-1-4673-0267-8) 2012. p. 866-871.*
Measurement and vulnerability analysis of overlay networks and peer-to-peer systems Dhungel, Prithula. ProQuest Dissertations and Theses 2012. vol. 0984,Iss.1540;p.n/a.*
Official Action received from USPTO dated Oct. 21, 2011 for U.S. Appl. No. 12/124,999, filed May 21, 2008.
Official Action received from USPTO dated Apr. 27, 2011 for U.S. Appl. No. 12/124,999, filed May 21, 2008.

* cited by examiner

*Primary Examiner* — Thanhnga B Truong
*Assistant Examiner* — Angela Holmes
(74) *Attorney, Agent, or Firm* — Brill Law Office; Jeffrey Brill

(57) ABSTRACT

Websites used for phishing are detected by analyzing end user confidential data submission statistics. A central process receives data indicating confidential information submitted to websites from a plurality of user computers. The received data is aggregated and analyzed, for example through statistical profiling. Through the analysis of the aggregated data, anomalous behavior concerning submission of confidential information to websites is detected, such is an unexpected, rapid increase in the amount of confidential information submitted to a given website. Responsive to detecting the anomalous behavior, further action is taken to protect users from submitting confidential information to that website. For example, an alert can be sent, a protective measure against the site can be published, the site can be added to a blacklist or a procedure to have the site shut down can be initiated.

12 Claims, 2 Drawing Sheets

ANTI-PHISHING EARLY WARNING SYSTEM BASED ON END USER DATA SUBMISSION STATISTICS

TECHNICAL FIELD

This invention pertains generally to computer security, and more specifically to using end user data submission statistics to protect users from phishing attacks.

BACKGROUND

Computer users are often victimized by phishing attacks, in which they unknowingly provide personal and confidential information to malicious websites. Phishing is an attempt to criminally and fraudulently acquire sensitive information, such as usernames, passwords and credit card details, by masquerading as a trustworthy entity in an electronic communication. Phishing attacks are commonly made by sending fraudulent emails or instant messages, and enticing users to click on a link and submit personal information to what appears to be a legitimate website.

Existing anti-phishing solutions use databases of known, active phishing sites in combination with end-user heuristic based techniques to determine whether a web site which is requesting information is trustworthy. Such database information is often not available to these solutions until hours or days after a phishing site goes live. The reason for this delay is that it often takes a period of time for a new phishing site to be discovered, and then for identifying information to be distributed to security software publishers and made available to their users. During this period of time, users may unknowingly expose their personal information to a malicious website without any warnings from their installed anti-phishing solution.

Additionally, heuristic detection approaches are becoming less effective as phishers become better at replicating original sites. Furthermore, phishing sites that do not imitate authentic sites, such as fake stores, are even more difficult to detect. Once a phishing site is discovered, new protections are provided to anti-phishing solutions to ensure users are protected until the site is shut down.

Because there can be a gap between the launch of a new phishing site and its detection, phishing attacks can succeed by producing a large number of phishing sites quickly, even where each site only collects confidential information concerning a few thousand users before being shut down. It would be desirable to robustly protect users from such phishing attacks.

SUMMARY

Websites used for phishing are detected by analyzing end user confidential data submission statistics. A central process receives data indicating confidential information submitted to websites from a plurality of user computers. The received data is aggregated and analyzed, for example through statistical profiling. Through the analysis of the aggregated data, anomalous behavior concerning submission of confidential information to websites is detected, such ds an unexpected, rapid increase in the amount of confidential information submitted to a given website. Such anomalous behavior indicates that the website is being used for phishing. Responsive to detecting the anomalous behavior, further action is taken to protect users from submitting confidential information to that website. For example, an alert can be sent to an appropriate party or automated system, a protective measure against the site can be published, the site can be added to a blacklist or a procedure to have the site shut down can be initiated.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
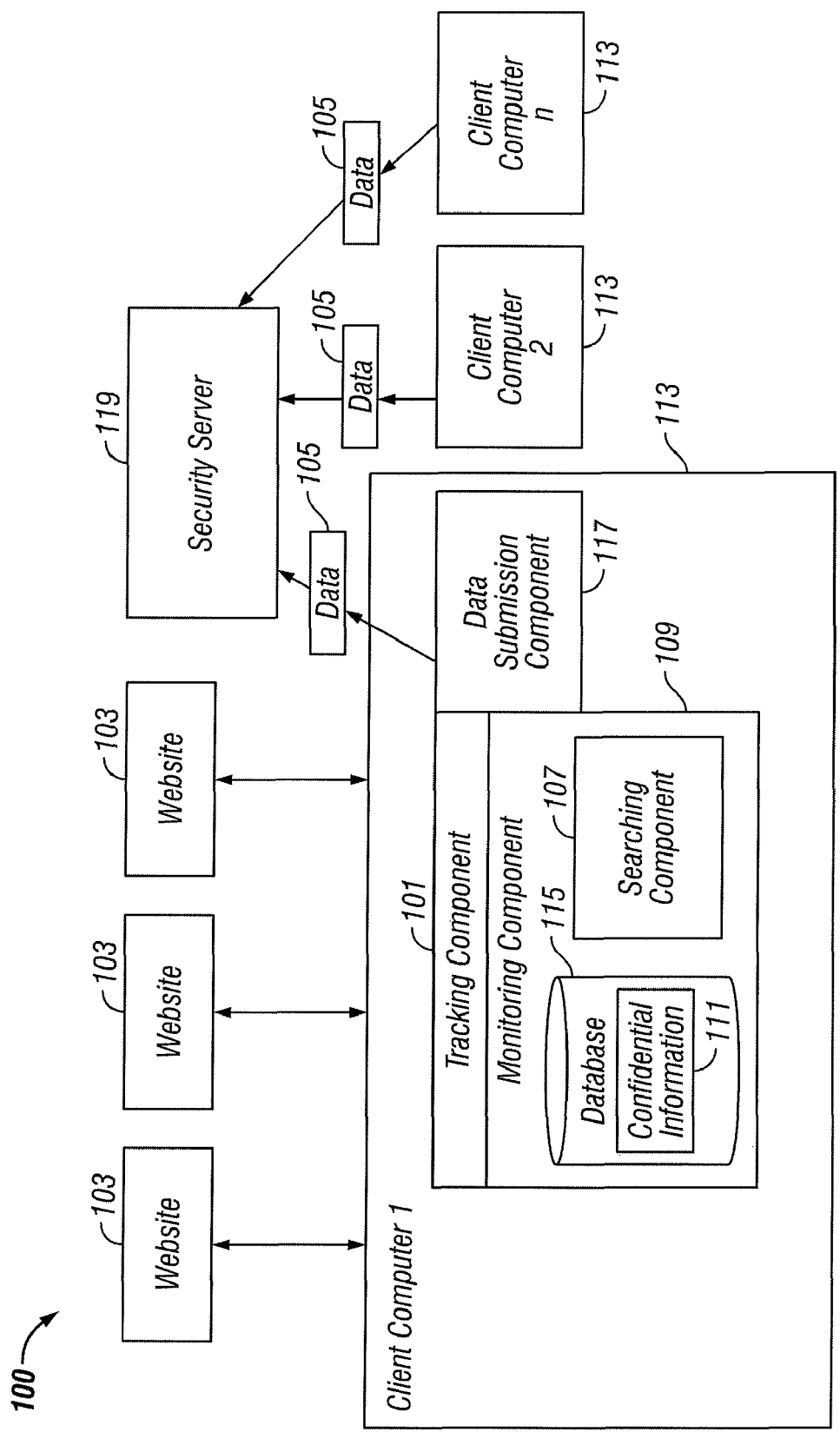
FIG. 1 is a block diagram illustrating a system for transmitting end user data concerning submitted confidential information central server for statistical analysis; according to some embodiments of the present invention.

FIG. 1 illustrates system 100 for transmitting end user data 105 concerning confidential information 111 submitted to websites 103 to a central server 119 for statistical analysis, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as plurality of separate programs, as a kernel loadable module, as one or more device drivers or as one or more statically or dynamically linked libraries.

As illustrated in FIG. 1, a tracking component 101 tracks websites 103 visited by a user. Individual tracking components 101 run on each of a plurality of user computers 113. FIG. 1 illustrates three user computers 113 as an example, but it is to be understood that typically the number would be much larger. In one embodiment, the tracking component 101 is implemented as a web browser plug-in that is capable to tracking user browsing history. In other embodiments, the tracking component 101 can be implemented in other ways, for example as an HTTP/HTTPS proxy (local or remote, configured or transparent), or as a component that parses a user's web browser history. The implementation mechanics of tracking websites 103 visited by users is within the skill set of those of ordinary skill in the relevant art, and the usage thereof within the context of the present invention will be readily apparent to one of such a skill level in light of this specification.

A monitoring component 109 monitors Outbound confidential information 111. The monitoring component consists of both a database 115 (or other suitable storage mechanism) for storing the confidential information 111, and a searching component 107 for searching outbound network traffic for occurrences of this confidential data 111. In one embodiment, the searching component 107 is implemented as a web browser plug-in, but it can also be implemented in other ways, such as a HTTP/HTTPS proxy (local or remote, configured or transparent).

The implementation mechanics of storing confidential information 111 and searching outbound network traffic for confidential information 111 are within the skill set of those of ordinary skill in the relevant art, and the usage thereof within the context of the present invention will be readily apparent to one of such a skill level in light of this specification. It is to be understood that what information is considered to be confidential is a variable design parameter. In different embodiments, specific data and types of information can be classified as confidential by users, system administrators, publishers of security software and/or other parties as desired.

The monitoring component 109 works in conjunction with the tracking component 101 to determine what sites 103 are visited and what confidential information 111 is transmitted to each visited site 103. As illustrated, a data submission component 117 submits this data 105 to a central repository for statistical analysis, as described in greater detail below.

In one embodiment, the data submission component 117 transmits the data 105 to a central computer security server 119, which receives such data 105 from each of the plurality of user computers 113. To maintain user privacy, the data 105 transmitted to the server 119 can be kept anonymous. To this end, user identifying information can be omitted, as a general summary of the submitted confidential information 111 is sufficient for statistical analysis. For example, the data 105 summarizing a submission of confidential information 111 could be in a format such as "1 VISA numbers, 1 pin number, 1 social security number, 1 name, 1 address, 2 phone numbers, 1 DOB submitted to amazon.com."

Although the data submission component 117 is illustrated as running on the client 113 and transmitting raw data 105 to the server 119, it is to be understood that in some embodiments, clients 113 can perform statistical compilation on the data 105 locally, and then transmit compiled statistics concerning confidential information 111 submitted to various websites 103. Whether the statistical compilation is performed by clients 113 or a server 119, or distributed between such computing devices in any combination, is a variable design choice.

Figure 2:
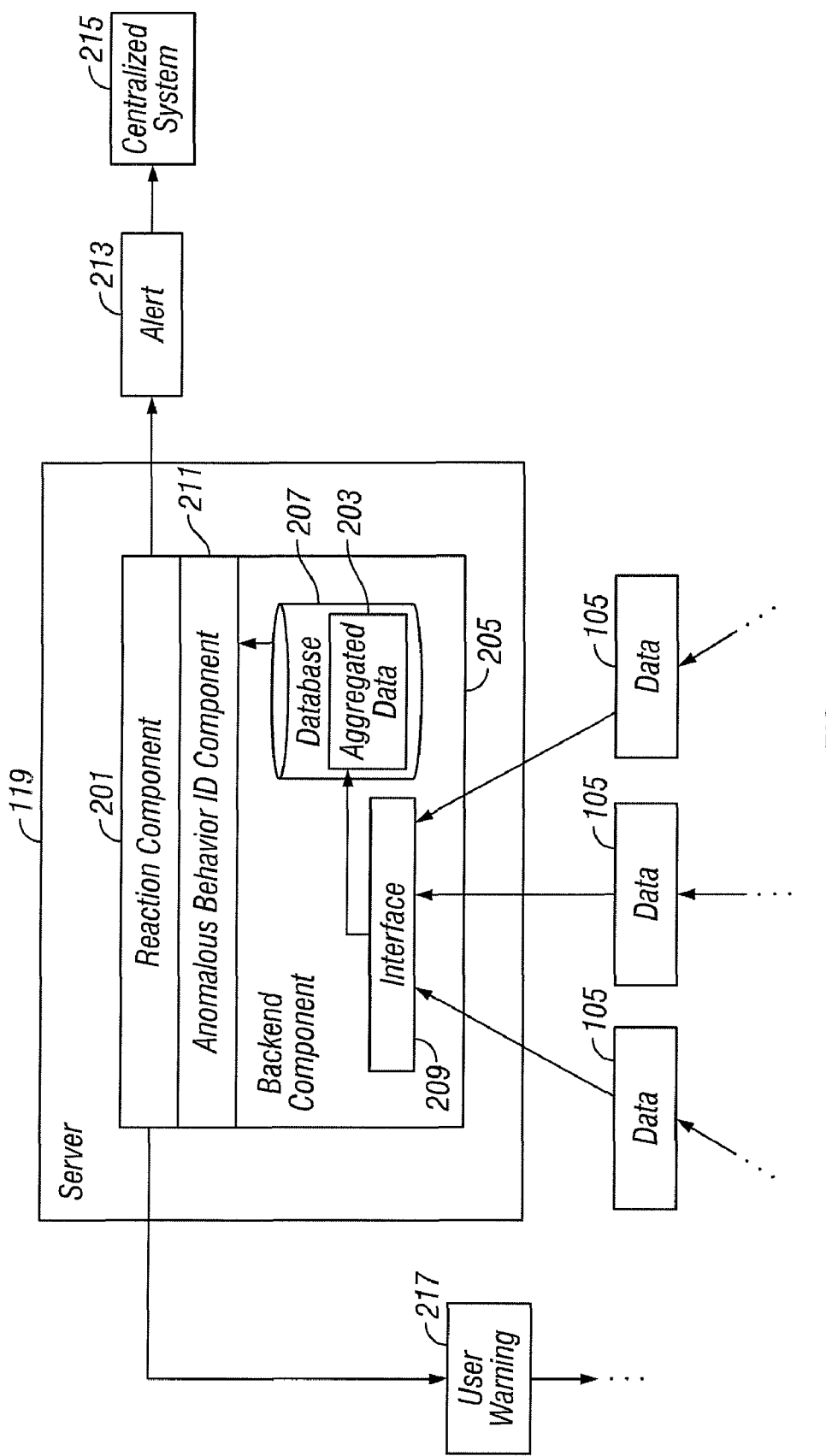
FIG. 2 is a block diagram illustrating a system for aggregating submitted end user data and detecting anomalous behavior indicative of phishing attacks, according to some embodiments of the present invention.

Turning now to FIG. 2, a backend component 205 running on the server 119 collects data 105 submitted by the plurality of user computers 113. The backend component 205 typically comprises a large database (or other suitable storage mechanism) 207, and a well defined interface 209 that allows the data submission components 117 running on user computers 113 to submit data 105. The backend component 205 aggregates the data 105 submitted from the various user computers 113, and stores the aggregated data 203 in the database 207 for statistical analysis as described below.

An anomalous behavior identification component 211 accesses the aggregated data 203 stored in the database 207 to identify anomalies in the data 105 being submitted to any given website 103. The corresponding analysis performed by the anomalous behavior identification component 211 can be as simple as detecting a spike in submission confidential information 111 to a given website 103, or as complicated as adaptive statistical anomaly detection, which applies statistical usage profiling to continuously modify a baseline, by which all confidential information disclosure activity is measured to identify anomalous behavior.

In one adaptive statistical anomaly detection form, the anomalous behavior identification component 211 maintains, two sets of usage data (not illustrated), a long-term confidential information 111 disclosure activity profile and a short-term confidential information 111 disclosure profile. The long-term disclosure profile encompasses a blend of confidential information 111 disclosure patterns observed over a long period of time, while the short-term disclosure profile represents the disclosure patterns over a short period of time. To detect potential phishing attacks, the anomalous behavior identification component 211 compares the short-term profile to the long-term profile, and detects statistically significant deviations. Such a detected deviation is considered an indication of a phishing attack, and is processed appropriately as described below. Of course, the magnitude of deviation which is considered to be statistically significant is a variable design parameter, as is what specific periods of time constitute "long" and "short" term.

Over time, the anomalous behavior identification component 211 rolls the short-term observed usage into the long-term usage profile, to account for legitimate changes in website 103 behaviors. This type of analysis would recognize, e.g., the differences between a new, legitimate online store that slowly grows in popularity and a phishing attack that receives thousands of hits in the first few hours. Further, the thresholds in this form of adaptive analysis can be tuned over time based, on observed attacks. The anomalous behavior identification component 211 would typically value different forms of confidential information 111 differently, e.g., submission of a social security number or PIN code should occur much less frequently than an email address or credit card number.

It is to be understood that various forms and methodologies of utilizing statistical analysis to detect anomalous behavior are known to those of ordinary skill in the art. The use of such statistical analysis within the context of the present invention will be readily apparent to those of such a skill level in light of the present specification. It is to be understood that the forms of statistical analysis described in detail above are simply examples.

Once anomalous behavior indicating a phishing attack is detected, a reaction component 201 can take appropriate action as desired. What specific action to take responsive to detecting anomalous behavior indicating a phishing attack is a variable design choice. In one embodiment, the reaction component 201 transmits an alert 213 to a centralized, automated computer security system 215 that can publish any of a number of protective measures against the attack, such as a new rule for an anti-phishing product, or a new entry in a database of known bad sites 103. The alert 213 can also be sent to a human technician (not illustrated), who can verify that the anomalous behavior in fact indicates a phishing attack. The technician could then publish a protective measure against the attack, or forward the alert to the automated system 215. The automated system 215 (or the technician) can also submit traceable dummy data to the detected phishing site 103, and initiate an interaction with the hosting ISP or registrar to have the site 103 taken down. In some embodiments, the reaction component 201 transmits appropriate warnings 217 to users, indicating the site 103 has been identified as malicious. With wide distribution of such as system, computer security investigators and companies would have a statistically significant view of confidential information 111 disclosures on the Internet, providing near real-time information to assist in the identification, shutdown, and protection against phishing attacks.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software; the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device. Accordingly, the disclosure of the present invention is intended to be illustrative, but not limiting, of the scope of the invention, which is set forth in the following claims.

What is claimed is:

1. A computer implemented method for detecting malicious websites based on end user data submission statistics, the method comprising the steps of:
   receiving data from each of a plurality of user computers which has been marked by the user computers as confidential information;
   aggregating data received from the plurality of user computers;
   analyzing the aggregated data, comprising:
      performing adaptive statistical anomaly detection, by applying statistical usage profiling to continuously modify a baseline;
      measuring confidential information disclosure activity in relation to the baseline;
      comparing the short-term profile to the long-term profile; and
      detecting a statistically significant deviation between the two profiles, the deviation indicating a short term increase in submission of confidential information to a website;
   based on the statistical analysis, detecting anomalous behavior concerning submission of aggregated confidential information received from the plurality of user computers to a website; and
   responsive to detecting the anomalous behavior concerning submission of confidential information to a website, performing at least one additional step to protect users from submitting confidential information to that website.

2. The method of claim 1 wherein detecting anomalous behavior concerning submission of aggregated confidential information to a website further comprises:
   detecting an increase in submission of confidential information to a website.

3. The method of claim 1 further comprising:
   over a period of time, incorporating short-term observed usage into the long-term usage profile, to account for legitimate changes in website behaviors.

4. The method of claim 1 wherein performing at least one additional step to protect users from submitting confidential information to the website further comprises:
   transmitting an alert to at least one destination from a group of destinations comprising: an automated computer security system, a technician, a system administrator and a user.

5. The method of claim 1 wherein performing at least one additional step to protect users from submitting confidential information to the website further comprises performing at least one step from a group of steps consisting of:
   publishing a new rule to protect against submission of confidential information to the website;
   adding the website to a list of known bad sites;
   transmitting a warning concerning the site to at least one user; and
   initiating a process to have the website shut down.

6. At least one non-transitory computer readable medium storing a computer program product for detecting malicious websites based on end user data submission statistics, the computer program product comprising:
   program code for receiving data from each of a plurality of user computers which has been marked by the user computers as confidential information;
   program code for aggregating data received from the plurality of user computers;
   program code for analyzing the aggregated data, comprising:
      performing adaptive statistical anomaly detection, by applying statistical usage profiling to continuously modify a baseline;
      measuring confidential information disclosure activity in relation to the baseline;
      comparing the short-term profile to the long-term profile; and
      detecting a statistically significant deviation between the two profiles, the deviation indicating a short term increase in submission of confidential information to a website
   based on the statistical analysis, program code for detecting anomalous behavior concerning submission of aggregated confidential information received from the plurality of user computers to a website; and
   program code for responsive to detecting the anomalous behavior concerning submission of confidential information to a website, performing at least one additional step to protect users from submitting confidential information to that website.

7. The computer program product of claim 6 wherein the program code for detecting anomalous behavior concerning submission of aggregated confidential information to a website further comprises:
   program code for detecting an increase in submission of confidential information to a website.

8. The computer program product of claim 6 further comprising:

program code for, over a period of time, incorporating short-term observed usage into the long-term usage profile, to account for legitimate changes in website behaviors.

9. The computer program product of claim 6 further comprising:

program code for, responsive to detecting the anomalous behavior concerning submission of confidential information to a website, determining the website is being used for phishing.

10. The computer program product of claim 6 wherein the program code for performing at least one additional step to protect users from submitting confidential information to the website further comprises:

program code for transmitting an alert to at least one destination from a group of destinations comprising:
an automated computer security system, a technician, a system administrator and a user.

11. The computer program product of claim 6 wherein the program code for performing at least one additional step to protect users from submitting confidential information to the website further comprises program code for performing at least one step from a group of steps consisting of:

publishing a new rule to protect against submission of confidential information to the website;
adding the website to a list of known bad sites;
transmitting a warning concerning the site to at least one user; and
initiating a process to have the website shut down.

12. A computer system for detecting malicious websites based on end user data submission statistics, the computer system comprising:

an interface to receive data from each of a plurality of user computers which has been marked by the user computers as confidential information;
a database to aggregate data received from the plurality of user computers;
an anomalous behavior ID component to analyze the aggregated data, and to detect anomalous behavior concerning submission of aggregated confidential information received from the plurality of user computers to a website, wherein analyzing the aggregated data comprises performing adaptive statistical anomaly detection, by applying statistical usage profiling to continuously modify a baseline, measuring confidential information disclosure activity in relation to the baseline, comparing the short-term profile to the long-term profile and detecting a statistically significant deviation between the two profiles, the deviation indicating a short term increase in submission of confidential information to a website; and
a reaction component to, responsive to detecting the anomalous behavior concerning submission of confidential information to a website from the statistical analysis, perform at least one additional step to protect users from submitting confidential information to that website.

* * * * *